Sept. 20, 1960 A. REDDING, JR 2,953,699
STATOR STRUCTURES FOR DYNAMO-ELECTRIC MACHINES
Filed Feb. 7, 1958
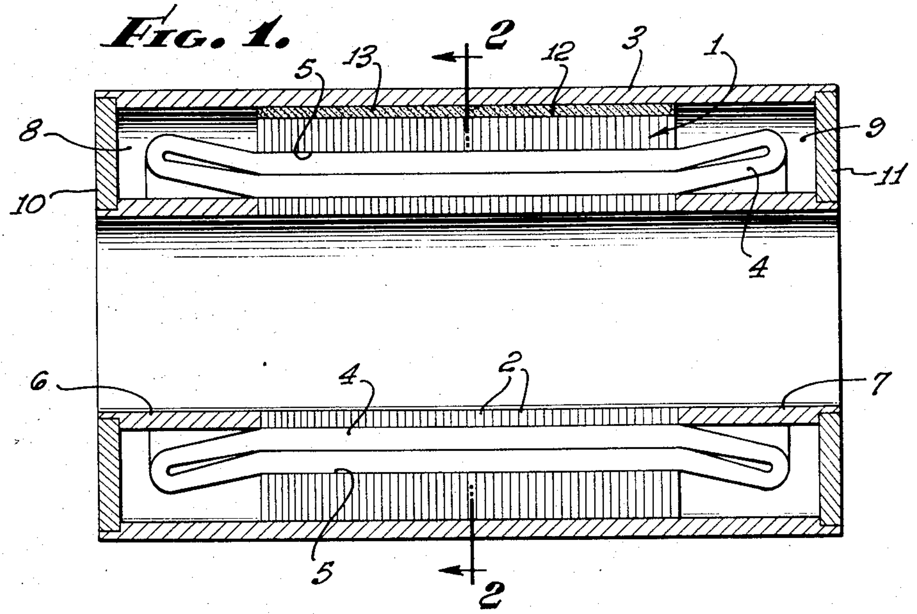
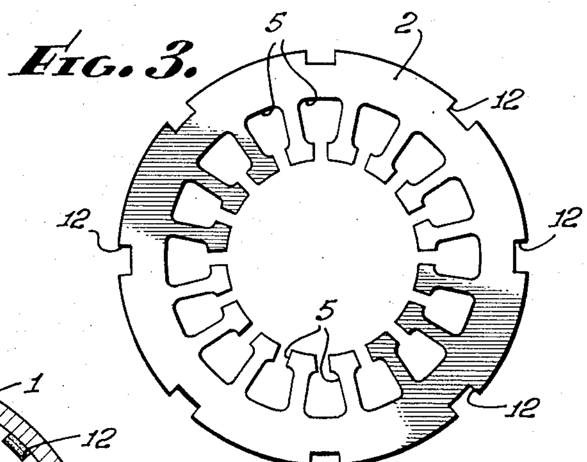
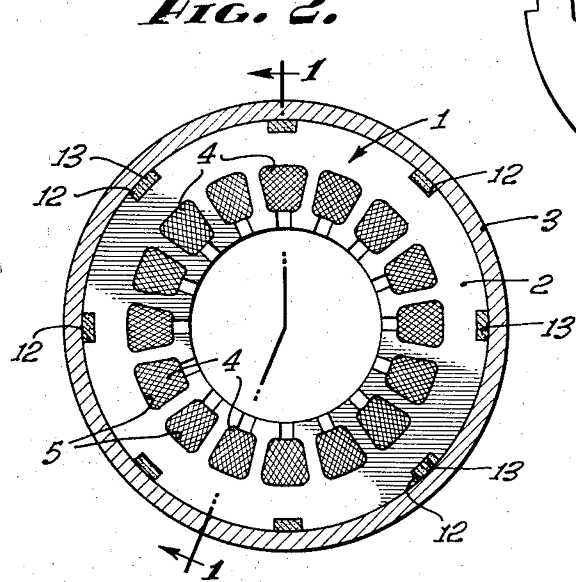
ALBERT REDDING, JR.
INVENTOR.
BY Flam and Flam
ATTORNEYS.

United States Patent Office 2,953,699

Patented Sept. 20, 1960

1

2,953,699

STATOR STRUCTURES FOR DYNAMO-ELECTRIC MACHINES

Albert Redding, Jr., South Gate, Calif., assignor to U.S. Electrical Motors, Inc., Los Angeles, Calif., a corporation of California Filed Feb. 7, 1958, Ser. No. 713,838

1 Claim. (Cl. 310—258)

This invention relates to dynamo-electric machinery, and particularly to alternating current motors utilizing stator structures.

For example, such stator structures include a stack of laminations supported in a casing and defining slots in the inner surface for the accommodation of primary windings. When the structure is used for an induction motor capable of being submerged, the casing is usually in the form of a cylindrical shell.

For submersible structures, the overall diameter of the stator is kept at a minimum; the casing or shell thus is intended closely to encompass the outer periphery of the laminations.

It is one of the objects of this invention to make it possible to attach the stack in the shell in a simple and effective manner, and particularly obviating the necessity of the usual fastening means.

It is another object of this invention to provide a stator structure in which accurate fit between the stack and the shell or casing is rendered unnecessary.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claim.

Referring to the drawings:

Figure 1 is a longitudinal sectional view of a complete stator structure incorporating the invention and taken along a plane corresponding to line 1—1 of Fig. 2;

Fig. 2 is a cross-section taken along a plane corresponding to line 2—2 of Fig. 1; and Fig. 3 is a plan view of one of the laminations utilized to form the stack of the stator structure.

The stator structure includes a stack 1 of laminations 2. The laminations 2 are of the form shown in Fig. 3. These laminations may be permanently joined together as by rivets or the like, in order to form the stack.

2

These laminations are supported in a casing or shell 3. This shell may be of cast iron. Stator windings 4 are accommodated in slots 5 formed in the laminations.

Tubular extensions 6 and 7 are provided for defining annular spaces 8 and 9 for the ends of the windings 4. Closure rings 10 and 11 serve to enclose this space 9.

In assembling the elements, the stack 1 is first fastened into the casing or shell 3, and prior to the installation of windings 4 or the extensions 6 and 7.

The internal diameter of the shell or casing 3 is intended to fit quite closely over the stack of laminations 1. The outside diameter of the stack 1 is purposely such as to fit quite readily within the casing or shell 3. Thus when assembled, the casing and laminations form ducts along the aligned notches 12.

In order to hold the stack 1 firmly in place, use is made of a plurality of recesses or slots 12, provided in the outer periphery of each of the laminations 2. These slots, after the stack 1 is placed within the shell or casing 3, are filled with a thermosetting plastic adhesive 13, for example of the epoxy type. The casing 3 and the stack 1 are thus subjected to heat to set the epoxy resin. This adhesive thus serves firmly to adhere the stack 1 to the casing 3. Furthermore, the epoxy resin may extend into the clearance space as a thin film between the stack 1 and the casing 3. This will bond the shell or casing 3 to the outer periphery of stack 1. This stack of laminations 1 is thus locked into the casing 3.

The inventor claims:

In a dynamo-electric structure: a shell having a substantially cylindrical and smooth uninterrupted interior surface; a stack of generally circular laminations positioned in said shell and providing a central bore in which a rotor is adapted to be accommodated; said laminations each having an outside diameter only slightly less than the inside diameter of said shell to provide a close tolerance fit of said laminations in said shell; each of the laminations having peripheral slots located in angularly spaced relationship with respect to each other and about the entire periphery thereof; said slots of successive laminations being aligned with each other to form in combination with said shell a series of circumferentially spaced ducts extending parallel to the axis of the bore; and a thermosetting plastic adhesive injected into each of said formed ducts to substantially completely fill said ducts and thermoset in situ to form an adherent bond between said laminations and shell.

References Cited in the file of this patent

UNITED STATES PATENTS

| | | |
|---|---|---|
| 1,085,116 | Ford | Jan. 27, 1914 |
| 1,852,829 | Welch | Apr. 5, 1932 |
| 2,668,925 | Blosser | Feb. 9, 1954 |

FOREIGN PATENTS

| | | |
|---|---|---|
| 306,158 | Switzerland | June 1, 1955 |
| 1,148,642 | France | June 24, 1957 |